(12) United States Patent
Pinhanez

(10) Patent No.: US 6,431,711 B1
(45) Date of Patent: Aug. 13, 2002

(54) MULTIPLE-SURFACE DISPLAY PROJECTOR WITH INTERACTIVE INPUT CAPABILITY

(75) Inventor: Claudio S. Pinhanez, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 1 day.

(21) Appl. No.: 09/779,212

(22) Filed: Feb. 8, 2001

Related U.S. Application Data
(60) Provisional application No. 60/251,591, filed on Dec. 6, 2000.

(51) Int. Cl.[7] .................. G03B 21/00; G03B 21/14; G03B 21/26
(52) U.S. Cl. ........................................ 353/69; 353/28
(58) Field of Search ............................. 353/28, 69, 11, 353/42, 44, 45, 50, 51, 62, 70; 352/69, 70

(56) References Cited

U.S. PATENT DOCUMENTS
3,212,398 A * 10/1965 Miller .......................... 353/70
6,003,995 A * 12/1999 Dugdale et al. .............. 348/36

OTHER PUBLICATIONS
Raskar et al., "The Office of the Future: A Unified Approach to Image–BasedModeling and Spatialy Immersive Displays," a Proc. of SIGGRAPH'98, p. 179–188, (1998).*

Underkoffler et al. "Emanicipated Pixels: Real–World Graphics in the Luminous Room," Proc. Of SIGGRAPH'99, 385–392 (1999).*

* cited by examiner

Primary Examiner—Russell Adams
Assistant Examiner—Andrew Sever
(74) Attorney, Agent, or Firm—Ryan, Mason & Lewis, LLP; Louis J. Percello, Esq.

(57) ABSTRACT

The present invention projects an image onto any surface in a room and distorts the image before projection so that a projected version of the image will not be distorted. The surface could be planar or non-planar. The present invention also allows for a projected image to be displayed at multiple locations along a surface or multiple surfaces. This allows a projected image to move from one location on a surface to another location on this or another surface, while the projected image remains undistorted through the move. Moreover, the present invention allows interaction between people and a projector. Interactive input, such as from mice, may be used with the versions of the present invention. Importantly, versions of the present invention can determine if an object is near an interactive item (such as a hyperlink) on the projected image. If so, the present invention can activate the interactive item. This allows a person to interact with a projected image.

33 Claims, 11 Drawing Sheets

MULTIPLE-SURFACE DISPLAY PROJECTOR WITH INTERACTIVE INPUT CAPABILITY

CROSS REFERENCE TO RELATED APPLICATIONS

This application claims the benefit of U.S. Provisional Application No. 60/251,591, filed Dec. 6, 2000.

FIELD OF THE INVENTION

The present invention relates to video projection systems and, more particularly, relates to a multiple-surface display projector with interactive input capability.

BACKGROUND OF THE INVENTION

Systems currently exist that project video images onto surfaces. One well known device in this genre is the common video projector. This system takes a single image, placed onto a glass plate, and displays it on a wall or screen. One problem with this system is that the video projector must be aligned with the wall or screen. If this is not the case, then the image displayed on the wall or screen will be distorted. This limits the effectiveness of this type of projector.

Another problem with this projector is that it is made to project on surfaces directly in front of the projector. It cannot, for instance, project on the ceiling or, without movement of the projector, on a wall that is not directly in front of the projector. Moreover, this projector cannot move its projected image across a wall without having human intervention. For example, to move a projected image from a certain location to a desired location to the left of the current location, an operator will have to physically move the projector into the proper position and adjust the focus. Furthermore, even with the focus adjusted, if the new position is not directly in front of the projector, the projected image will be distorted.

Newer projectors are much more complex. These devices can accept different types of video sources, project using Digital Light Processing and other advanced technologies, and project using High Definition Television and other high definition standards. However, even these devices require the projector to be aligned with the wall or screen. If not aligned this way, distortion will result. Additionally, none of the projectors allow the image to be moved, without user intervention, from one location to another.

Another problem with old and new video projectors is that they are simple "one-way" devices. In other words, they can transmit video, but there are limited ways for the user to have any type of interaction with the system. For example, when giving a presentation, the presenter will generally have certain slides that he or she wishes to present. To change slides, the presenter must control the projector itself. This generally involves moving from the presentation area back to projector, changing the slide, and then moving back to the presentation area. This breaks the flow of the presentation. There are remote control devices that alleviate this problem somewhat, but the remote control devices introduce additional problems. Consequently, these systems are not interactive in a convenient way.

Thus, what is needed is a way of projecting video that overcomes the problems of (i) projecting video only on a surface directly in front of the projector, (ii) distortion caused when the surface being projected onto is not perfectly in front of the projector, (iii) requiring human intervention to change a projected image from one location to another, and (iv) the lack of convenient interactivity for projection systems.

SUMMARY OF THE INVENTION

The present invention solves the problems of the prior art by, in general, projecting an image onto any surface in a room and distorting the image before projection so that a projected version of the image will not be distorted. The present invention also allows for a projected image to be displayed at multiple locations along a surface or multiple surfaces. This allows a projected image to move from one location on a surface to another location on this or another surface, while the projected image remains undistorted through the move.

Moreover, the present invention allows interaction between people and a projector. Interactive input, such as from a mouse, keyboard or speech, may be used with versions of the present invention. Importantly, versions of the present invention can determine if an object is near an interactive item (such as a hyperlink) on the projected image. This can occur, for instance, if a person places a hand over the projected image and near an interactive item. If so, the present invention can activate the interactive item. This allows a person to interact with a projected image, e.g., as if his or her hand was a computer mouse or other input device.

A more complete understanding of the present invention, as well as further features and advantages of the present invention, will be obtained by reference to the following detailed description and drawings.

DETAILED DESCRIPTION OF PREFERRED EMBODIMENTS

Figure 1:
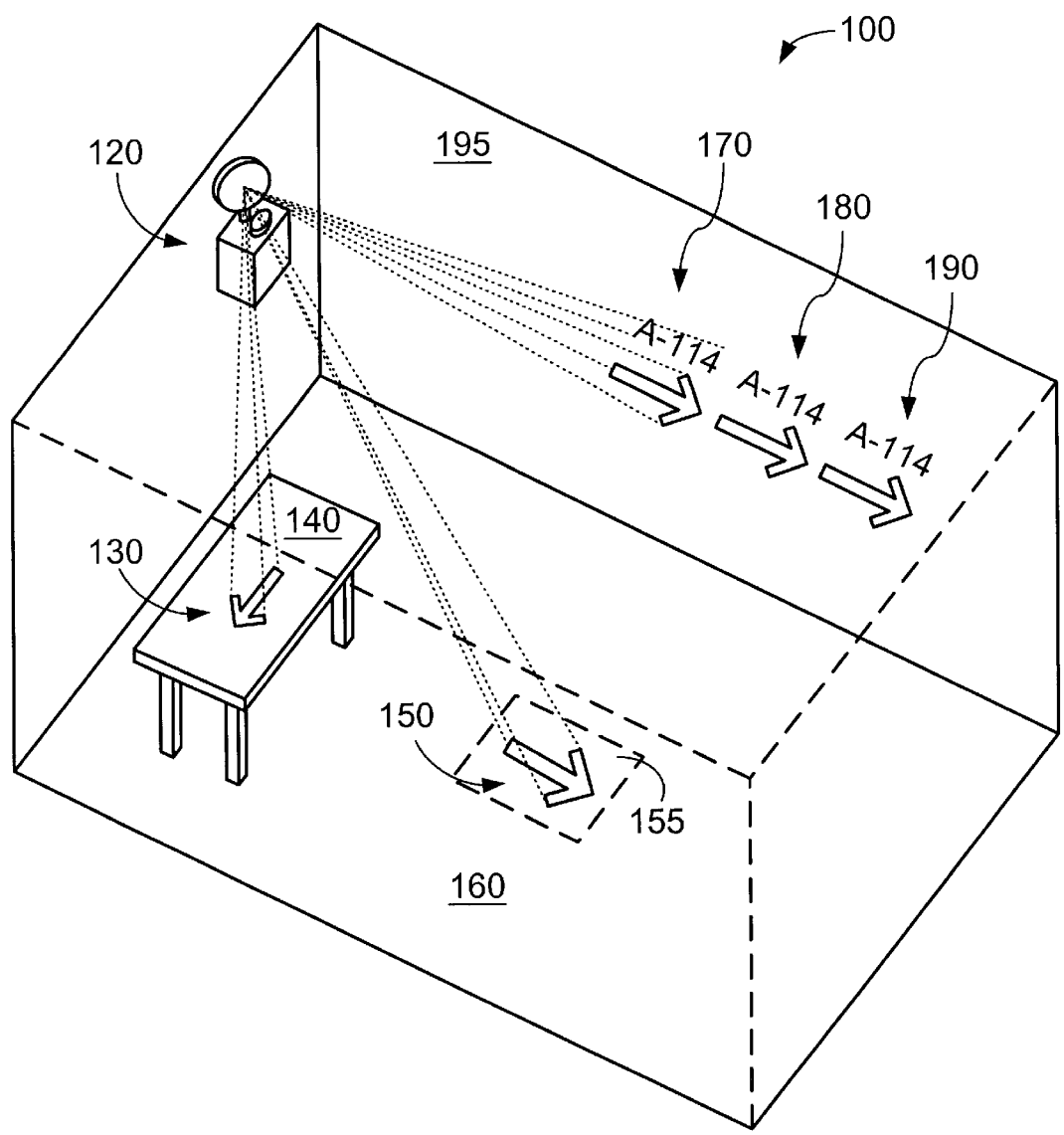
FIG. 1 is a representation of a room having a multiple-surface display projector in accordance with one embodiment of the present invention.

Referring now to FIG. 1, this figure provides an overview of the present invention. FIG. 1 shows a room 100 in which a multiple-surface display projector 120 is placed. Multiple-surface display projector 120 will be discussed in greater detail in reference to upcoming figures, so only an introduction of the multiple-surface display projector 120 will be given in reference to FIG. 1.

In room 100 of FIG. 1, table 140 is placed on floor 160, and wall 195 adjoins floor 160. Multiple-surface display projector 120 can project an image on one of any number of surfaces. In FIG. 1, multiple-surface display projector 120 is projecting an image 130 onto table 140, an image 150 onto floor 160, and images 170, 180, 190 onto wall 195. The multiple-surface display projector 120 will generally project only one image at a time. For instance, the multiple-surface display projector could display image 130 and not images 170, 180, 190, and 150.

The images 130, 150, 170, 180, and 190 displayed by multiple-surface display projector 120 are undistorted. To create undistorted images on table 140, floor 160 and wall 195, the multiple-surface display projector 120 will use an undistorted image and distort this image so that, when the image arrives at the surface onto which it is to be displayed, it will be undistorted when displayed. This is discussed in greater detail in reference to FIGS. 1 through 6. The multiple-surface display projector 120 should be calibrated so that it can properly show images at each location on each surface. For instance, image 150, shown at destination area 155 of floor 160, will require different distortion for its undistorted image than will image 130, shown on table 140.

Images 170 through 190 illustrate another aspect of a multiple-surface display projector 120, which is the ability to move distortionless images along a surface. Images 170 through 190 are displayed one at a time, with image 170 displayed first, image 180 displayed next, and image 190 displayed last. This allows the image to be moved along wall 195. This would be useful, for instance, to direct someone to a room location. At each location on wall 195, the multiple-surface display projector 120 will use different parameters so that the image at the surface is undistorted. These parameters could be stored for each location. Alternatively, some parameters could be stored for some locations and the parameters for a different location calculated from the stored parameters. Finally, the surface itself could be mathematically described and parameters could be determined from the mathematical description of the surface.

In general, a video projector produces a rectangular image that has a particular aspect ratio. By "distortionless", "distortion-free" or "substantially undistorted" it is meant, for these types of projectors, that the projected image at the destination area (called the "displayed image" herein) is an image that preserves the same proportion of width to length of the original rectangular image (the "undistorted image") and preserves the 90 degree angles of the original rectangular image. For other types of projectors (producing, for instance a round image), distortionless means that the displayed image will retain the same approximate proportions and angles as the undistorted image.

Although not shown in FIG. 1, but discussed below, the multiple-surface display projector 120 can also interact with a person, for example, using mouse or keyboard inputs or voice-recognized technology. Additionally, a person could hold an object or an obstruction, such as the person's hand, between the multiple-surface display projector 120 and the displayed image. If the obstruction is near or over an interactive item, the multiple-surface display projector 120 can activate the interactive item. Consequently, the multiple-surface display projector 120 could activate a hyperlink and then show additional images related to the hyperlink. Similarly, the multiple-surface display projector 120 can also determine if an object, such as a laser pointer, is near an interactive item.

Figure 2:
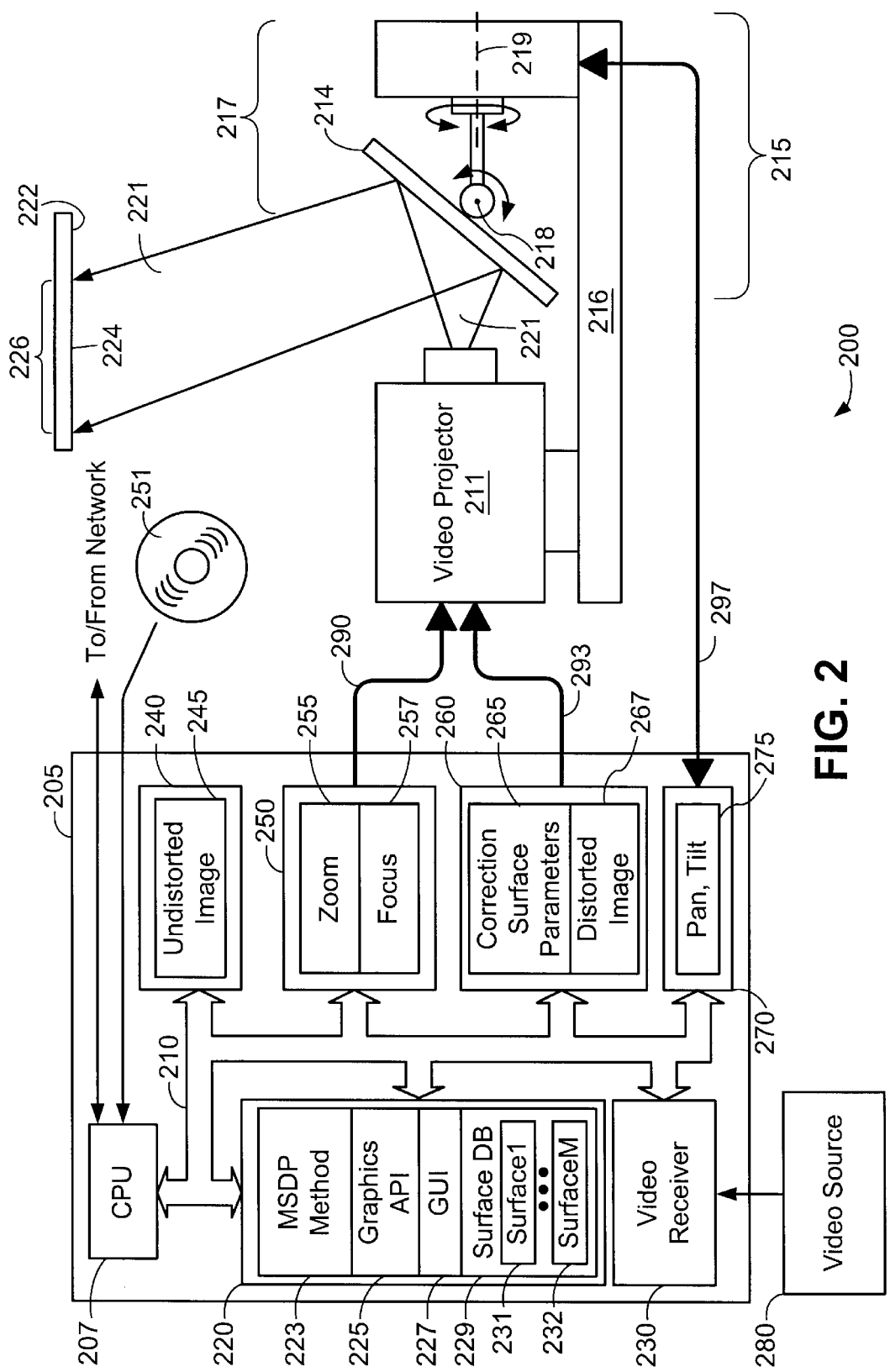
FIG. 2 is a block diagram of a multiple-surface display projector in accordance with one embodiment of the present invention.

Referring now to FIG. 2, this figure shows a block diagram of one exemplary multiple-surface display projector 200. In this embodiment, the multiple-surface display projector 200 is non-interactive. Multiple-surface display projector 200 comprises a multiple-surface display controller 205, video projector 211, connection system 216, and a redirection device 215. Multiple-surface display projector 200 is connected to a video source 280, is projecting a projected image 221 onto destination area 226 of destination surface 222 to create a displayed image 224, and can receive computer-readable code means from sources such as compact disk 251.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The multiple-surface display controller 205 comprises a processor 207, a bus 210, a memory 220, a video receiver 230, video memory 240, a projector controller 250, a distortion controller 260, and redirection controller 270. Memory 220 comprises a multiple-surface display projector method 223, a graphics Application Programmer Interface (API) 225, a Graphical User Interface (GUI) 227, and a surface DataBase (DB) 229 having M sets of surface parameters 231 through 232. Video memory 240 comprises an undistorted image 245. Projector controller 250 comprises zoom 255 and focus 257 parameters and produces projector control signal 290. Distortion controller 260 comprises correction surface parameters 265 and distorted image 267. Redirection controller 270 comprises pan and tilt locations 275.

Redirection device 215 comprises mirror 214 and pan/tilt mechanism 217. The mirror 214 has multiple degrees of freedom. In particular, the mirror is free to move relative to tilt axis 218 and pan axis 219. The multiple degrees of freedom of the mirror are in marked contrast to normal video projectors, which have zero degrees or one degree of freedom. The pan/tilt mechanism 217 moves mirror 214 about these multiple degrees of freedom and selects one pan and one tilt location from a number of such locations. The combination of the mirror 214 and pan/tilt mechanism 217 allows the redirection device 215 to direct an image to almost any surface in a room. Connection system 216 is optional but may be used to mount video projector 211 and redirection device 215 to a wall or other suitable location. Additionally, connection system 216 can be designed to allow for proper spacing between the video projector 211 and the redirection device 215: too much spacing can cause an image projected by the video projector 211 to be larger than mirror 214, and too little spacing will not allow mirror 214 to tilt as much as desired.

Redirection device 215 can be any device that can redirect light, e.g., a lens or a system of lenses, a mirror or multiple mirrors, fiber optics, or any combination of these. Preferably, the redirection device is motorized and computer controllable. There are many such possible motorized and computer controllable devices in theatrical lighting, and a pan/tilt head is a popular and convenient redirection device.

The multiple-surface display controller 105 in this example is a personal computer that comprises the processor 207 operatively coupled to the memory 220 through bus 210. Although shown as one physical unit, bus 210 can be any number of buses or interconnections. Memory 220 will configure the processor 105 to implement the methods, steps, and functions disclosed herein. The memory 220 could be distributed or local and the processor could be distributed or singular. The memory 220 could be implemented as an electrical, magnetic or optical memory, or any combination of these or other types of storage devices. It should be noted that, although memory 220 is shown separately from other elements of multiple-surface display controller 205, this is not necessarily the case for all applications. For example, video memory 240 is commonly part of a video adapter but in some systems is also part of Random Access Memory (RAM). Moreover, the term "memory" should be construed broadly enough to encompass any information able to be read from or written to an address in the addressable space accessed by processor 207. With this definition, information on a network is still within memory 220 of the multiple-surface display controller 205 because the processor 207 can retrieve the information from the network.

Similarly, although processor 207 is shown separately from elements of multiple-surface display controller 205, many or all of these elements may be combined into one integrated circuit. The processor 207 would then be part of this integrated circuit.

multiple-surface display projector method 223 is a method that controls the multiple-surface display projector 200. As such, it can comprise any or all of the methods in FIGS. 3–5, 7, 10, and 11 that will be discussed below. Multiple-surface display projector method 223 controls multiple-surface display projector 200 to allow the multiple-surface display projector 200 to take an undistorted image, distort the undistorted image to a distorted image, and project the distorted image onto a destination area of a destination surface.

The multiple-surface display projector method 200 can receive undistorted images from any of a number of sources. An undistorted image is defined herein as the source image that will be distorted and projected. Shown in FIG. 1 are two sources of images: a video memory 240, and a video source 280. Video memory 240 has an undistorted image 245, which has digital information corresponding to a particular image. The undistorted image 245 in video memory 240 could be placed there by a video adapter. This would occur if the screen (not shown) is being projected. The undistorted image 245 may be placed in video memory 240 through other methods, such as through connections (e.g., universal serial bus connections or other serial connections).

Video source 280 provides an additional way for multiple-surface display controller 205 to receive images. The video source 280 communicates with video receiver 230 to allow video images to be brought into multiple-surface display controller 205. These video images could be a series of images (e.g., movie images from a digital video disk or video cassette recorder) or could be still images (e.g., bitmap images). The video source 280 could be a Digital Video Disk (DVD) player that communicates analog or digital video information to the video receiver 230, which would be a graphics board. Alternatively, video source 280 could be a compact disk (CD) that is read by a CD reader (as video receiver 230) and that contains bitmap images or presentation images. Also, video source 280 can be the output of a computer to a monitor, digital or analog, following, but not exclusively limited to, the VGA, SVGA, and XGA standards.

Regardless of how the images are input into multiple-surface display controller 205, the multiple-surface display controller 205 needs to distort these images so that they are displayed correctly when shown at a destination area. The methods used to do this are explained in more detail below, but a short explanation will be given here. Multiple-surface display controller 205 is calibrated for particular destination areas on destination surfaces. This calibration results in parameters that are used to control elements of multiple-surface display projector 200 in order to ensure that a projected image will not be distorted when it reaches its destination area. In general, there will be one set of parameters for each destination area of a destination surface. However, as previously discussed, it is possible to determine some sets of parameters and calculate other sets, and it is possible to calculate sets of parameters based on mathematical descriptions of surfaces.

FIG. 2 contains a surface database 229 that contains multiple sets of parameters 231 through 232. Each set of surface parameters 231 through 232 contains parameters for one particular destination area, and each set of surface parameters 231 through 232 is used to ensure that an image is properly displayed at one destination area. The multiple-surface display projector 200 can select the appropriate parameters for the specific destination area that is selected.

For the destination area 226 of the destination surface 222 in FIG. 2, the multiple-surface display controller 205 has determined a set of parameters to be used for this particular location. These parameters comprise correction surface parameters 265, zoom 255 and focus 257 parameters, and pan and tilt parameters 275.

Correction surface parameters 265 are used to define a correction surface (shown in FIG. 6) in the distortion controller 260. The correction surface is used to distort an undistorted image, such as undistorted image 245 of video memory 240, into a distorted image 267. A distorted image is defined herein as the image that results when the undistorted image is mapped from its initial plane, orientation or translation to another plane, orientation or translation. The distorted image is the image to be and that is projected by the video projector 211. The distortion controller 260 maps an undistorted image to a correction surface to create a distorted image 267.

There are a number of ways that the distortion controller 260 can perform this mapping. The distortion controller 260 could be a software object or function, run on processor 207, that performs this mapping. Preferably, the distortion controller 260 could be a hardware device that performs this mapping at a fast enough speed to allow video source 280 to be full motion video, such as progressive-scan film or progressive-scan high definition television video. Another option is for distortion controller 260 to be a computer graphics video adapter card.

If distortion controller 260 is a computer graphics card, then multiple-surface display projector method 223 can use the graphics API 225 to define the correction surface parameters 265, to retrieve the undistorted image 245 from video memory 240, and to send this undistorted image to the distortion controller/video adapter 260 to create distorted image 267. Such graphics APIs could be, for instance, DIRECTX, which is a graphics API for operating systems made by MICROSOFT, a software manufacturer. In this case, the correction surface parameters are (see also FIG. 6) X, Y, and Z information that define the rotations of a correction plane about the X, Y, and Z axes, respectively, a scale that defines how the image is to be scaled, a lens that defines the focal length of a virtual camera, and X and Y translations that define X and Y translations, respectively, of the correction plane on the X-Y plane.

Once the distortion controller/video adapter 260 maps the undistorted image to the distorted image 267, it transmits the distorted image 293 to video projector 211. The distorted image 293 will generally be carried on an analog signal through RCA or 9-pin DIN connectors in standards such as VGA, SVGA, or XGA. Nonetheless, the distorted image 293 could be carried on analog or digital signals. The video projector 211 can be any type of projector, except projectors comprised of three separated red/green/blue projection beams, although it is helpful if zoom and focus can be remotely controlled by a computer.

The multiple-surface display projector method 223 also sets the parameters of zoom 255 and focus 257. These are transmitted by projection controller 250 through signal 290 to the video projector 211. Other parameters may also be controlled by projection controller 250, such as contrast, brightness and whether the video projector accepts and outputs progressive or interlaced video.

The video projector 211 projects a projected image 221. The projected image is defined herein as the image that leaves the projector, hits the mirror and travels until just before the destination surface. This image is a combination of the distorted image, parameters of the video projector (such as zoom 255 and focus 257), and, to a lesser degree, parameters of the redirection device 215 (such as pan and tilt locations 275).

To set the location onto which an image is projected, the multiple-surface display projector method 223 sets the pan and tilt parameters 275. These parameters are transmitted to the redirection device 215, over signal 297, by the redirection controller 270.

In FIG. 2, the video projector 211 projects projected image 221 onto destination area 226 to create a displayed image. A displayed image is herein defined as the projected image at the destination area of the destination surface. The displayed image should not be distorted and should resemble the undistorted image.

In a possible embodiment, the redirection device 215 is a standard pan/tilt head used in theatrical lighting and is controlled by the DMX protocol. The mirror 214 is controlled (by a pan/tilt head controller board as redirection controller 270) through a parallel port interface, through a DMX cable and to a DMX input/output of the redirection device 215. A video image is digitized by a standard 30 Hertz video adapter into undistorted image 245. Distortion controller 260 is a video adapter that compensates for sheer and linear distortion by texture mapping the undistorted image on the correction surface. To display existing computer applications, the undistorted image is obtained directly from video memory 240.

One way that multiple-surface display projector method 223 calibrates multiple-surface display projector 200 for a particular destination area is to allow an operator to see a displayed image that is a representation of a calibration image. If distortion is seen in the displayed image, the operator can interact with GUI 227 (shown more particularly in FIG. 6) to adjust the parameters of the projected image until distortion is no longer seen.

Thus, FIG. 2 shows a multiple-surface display projector 200 that can project undistorted images onto any surface in a room. It should be noted that, although multiple-surface display controller 205 is shown separately from video projector 211, the multiple-surface display controller 205 could be integral to the video projector 211.

It should be noted that the multiple-surface display projectors of the present invention can project onto any relatively flat, planar surface. Additionally, the multiple-surface display projectors of the present invention can be made to project on surfaces of any shape, although in this case the correction of distortion involves an accurate mathematical model of the surface. A reference that discusses methods to distort images projected on non-flat surfaces is Raskar et al., "The Office of the Future: A Unified Approach to Image-Based Modeling and Spatially Immersive Displays," Proceedings of SIGGRAPH'98 (Special Interest Group on Computer Graphics, a department of the Association for Computing Machinery), Orlando, Fla., pp. 179–188, July, 1998, which is incorporated herein by reference.

Figure 3:
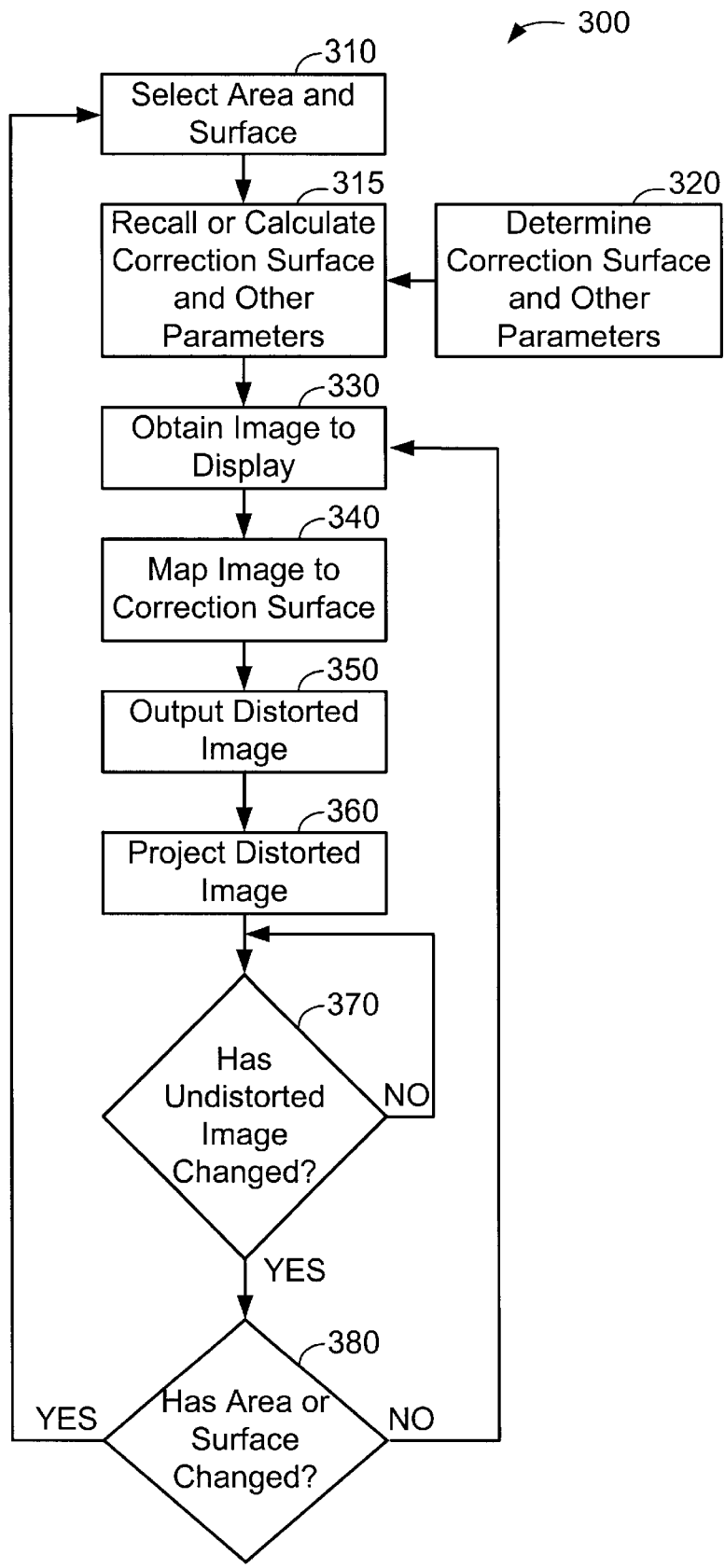
FIG. 3 is a flowchart of a method, in accordance with one embodiment of the present invention, for projecting an undistorted image so that a displayed image will be undistorted when shown at a selected destination area.

Turning now to FIG. 3, this figure shows a flowchart of a method 300 for projecting an undistorted image so that a displayed image will be undistorted when shown at a selected destination area. This method is performed whenever it is desired that video be projected onto some destination area in a room. Method 300 begins when the destination area and surface are selected. As previously discussed, each destination area will have parameters associated with it that allow a displayed image to be undistorted.

In step 315, these parameters are recalled or calculated. They can be calculated from a mathematical representation of the destination surface and the location of the destination area. Additional information such as the location and orientation of the multiple-surface display projector may be added to this calculation. These parameters may also be calculated by using two or more parameter sets that have been determined for destination areas on the destination surface. For instance, assume that a display image is to be moved to a destination area along a wall, parallel to the floor, and between two destination areas that are parallel to the floor, that are at the same height as the new destination area, and that already have parameters calculated for them. In this case, the multiple-surface display projector can approximate the set of parameters for the new destination area as a linear interpolation of the parameters for the two destination areas.

Some of the parameters may be set in step 315, if desired. For example, this step can also include adjustment of the pan and tilt locations for a pan/tilt head, which will adjust the mirror relative to its multiple degrees of freedom, and setting the zoom and focus parameters of the projector.

If the set of parameters has not yet been determined, the parameters may be determined in step 320. Step 320 will be more particularly described in reference to FIG. 4 (see also FIG. 6).

In step 330, an undistorted image to be displayed is obtained. This step is more particularly described in FIG. 5. The undistorted image could come from any image source, such as a DVD player, video cassette recorder, computer output, satellite receiver, or presentation software. In step 340, the undistorted image is mapped to the correction surface. This will properly translate, rotate, scale, and shear the undistorted image so that it will be displayed properly at a destination area. In step 350, the distorted image is output to the video projector. This output could be analog or digital.

In step 360, the distorted image is projected. If not performed previously, step 260 can also include adjustment of the pan and tilt locations for a pan/tilt head, which will adjust the mirror relative to its multiple degrees of freedom, and setting the zoom and focus parameters of the projector.

In step 370, it is determined if the undistorted image is changed. If not (step 370=NO), the distorted image is output. If the undistorted image has been changed (step 370=YES), step 380 is performed. The change in the undistorted image may be made in a number of ways. If the system of FIG. 2 is being used, for instance, an Operating System (OS) interrupt could be generated when the undistorted image changes. Alternatively, if the multiple-surface display projector is projecting down a wall, a timer could interrupt and cause the distorted image to change.

In step 380, it is determined if the area or surface has changed. The area or surface could change through human intervention or through programming of the multiple-surface display projector. If the area or surface has changed (step 380=YES), the method is again performed starting at step 380. If the area or surface has not changed (step 380=NO), part of the method is performed, starting at step 330.

It is also possible to perform steps 370 and 380 in parallel. This would be beneficial if, for example, the same undistorted image is being displayed but the area or surface is changing. Note that in the latter situation the same image would be obtained in step 330.

Thus, method 300 allows a multiple-surface display projector to display images on any surface and to move images across surfaces while still displaying distortion-free images.

Figure 4:
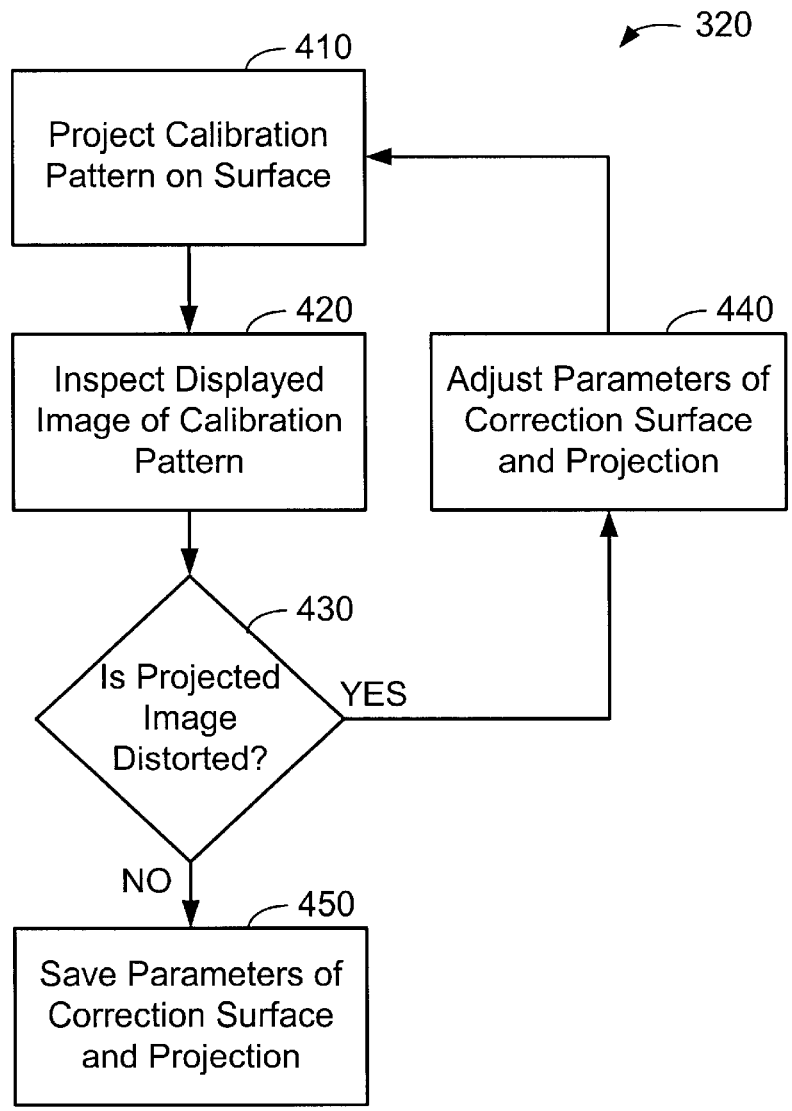
FIG. 4 is a flowchart of a method, in accordance with one embodiment of the present invention, of adjusting correction surface and other parameters.

To calibrate a multiple-surface display projector (without interactive capability) for a particular destination area of a destination surface, method 320 of FIG. 4 is used. Method 320 is a method that involves human intervention to determine whether patterns are or are not distorted. However, the method may easily be modified, in manners known to those skilled in the art, to provide automatic calibration. Automatic calibration will also be discussed in more detail in reference to FIG. 11.

Figure 6:
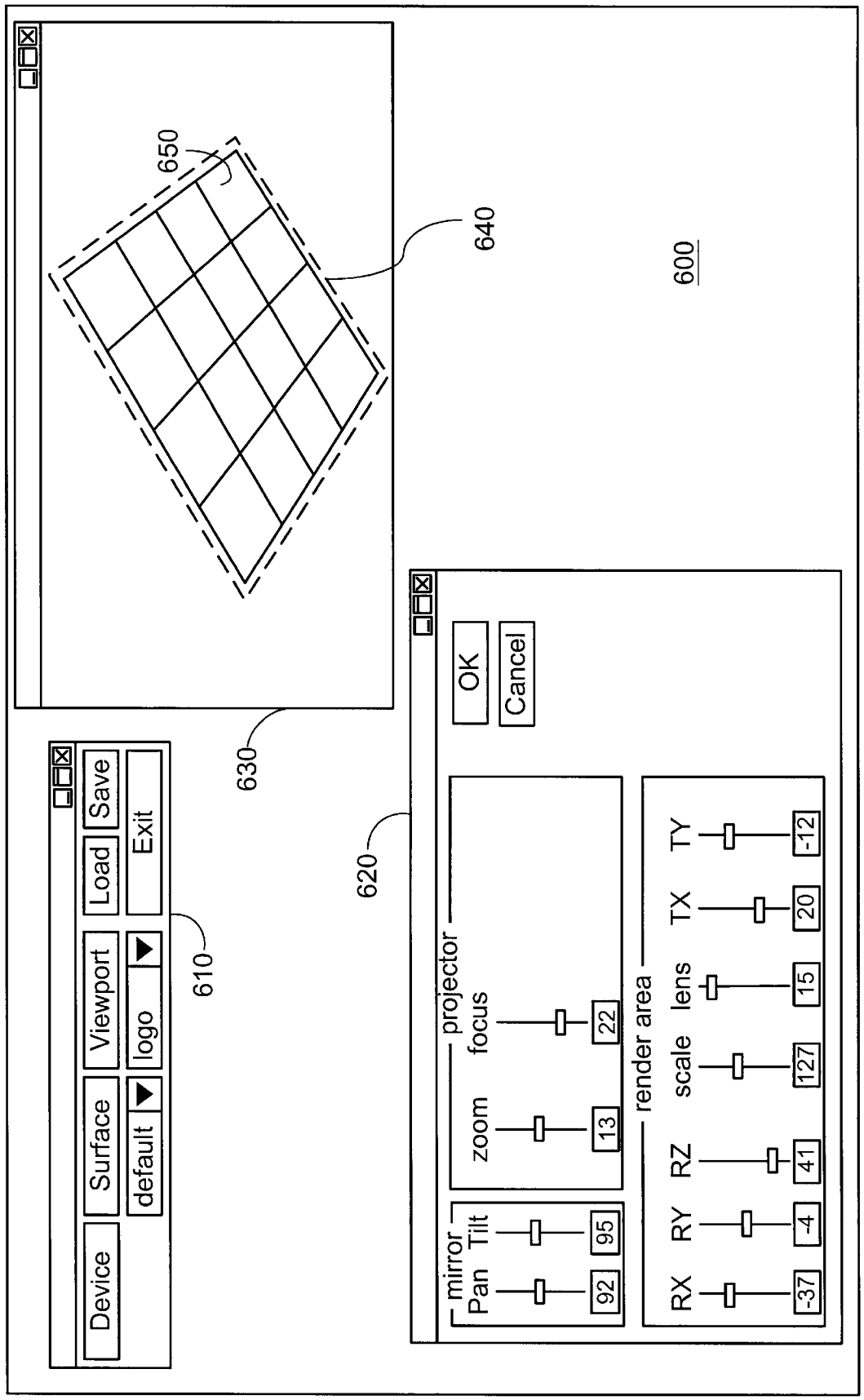
FIG. 6 is an exemplary screen shot of a graphical user interface for a multiple-surface display projector in accordance with one embodiment of the present invention.

Method 320 begins when a calibration pattern is projected onto a destination surface (step 410). An example calibration pattern is shown in FIG. 6, and such patterns are well known to those skilled in the art. This step may also included determining and saving the pan and tilt parameters for a pan/tilt head. This will save the relative location of the mirror, which allows images to be projected onto the destination area. In step 420, an operator inspects the displayed image of the calibration pattern. This is the image of the calibration pattern as it exists at the destination area, with current correction surface parameters and video projector parameters.

If the projected image is distorted (step 430=YES), the parameters can be manually adjusted (step 440). This adjustment comprises changing parameters of the correction surface and the projector. A GUI used for adjusting parameters is shown in FIG. 6. Once the parameters are adjusted, the process starts over again at step 410. If the projected image is not distorted (step 430=NO), the parameters for the correction surface and projector are saved (step 450).

Method 320 may be performed for as many destination areas as desired. Each set of parameters for each destination area can be stored for later recall. This will allow the multiple-surface display projector to project distortion-free images on any of a number of destination areas.

Figure 5:
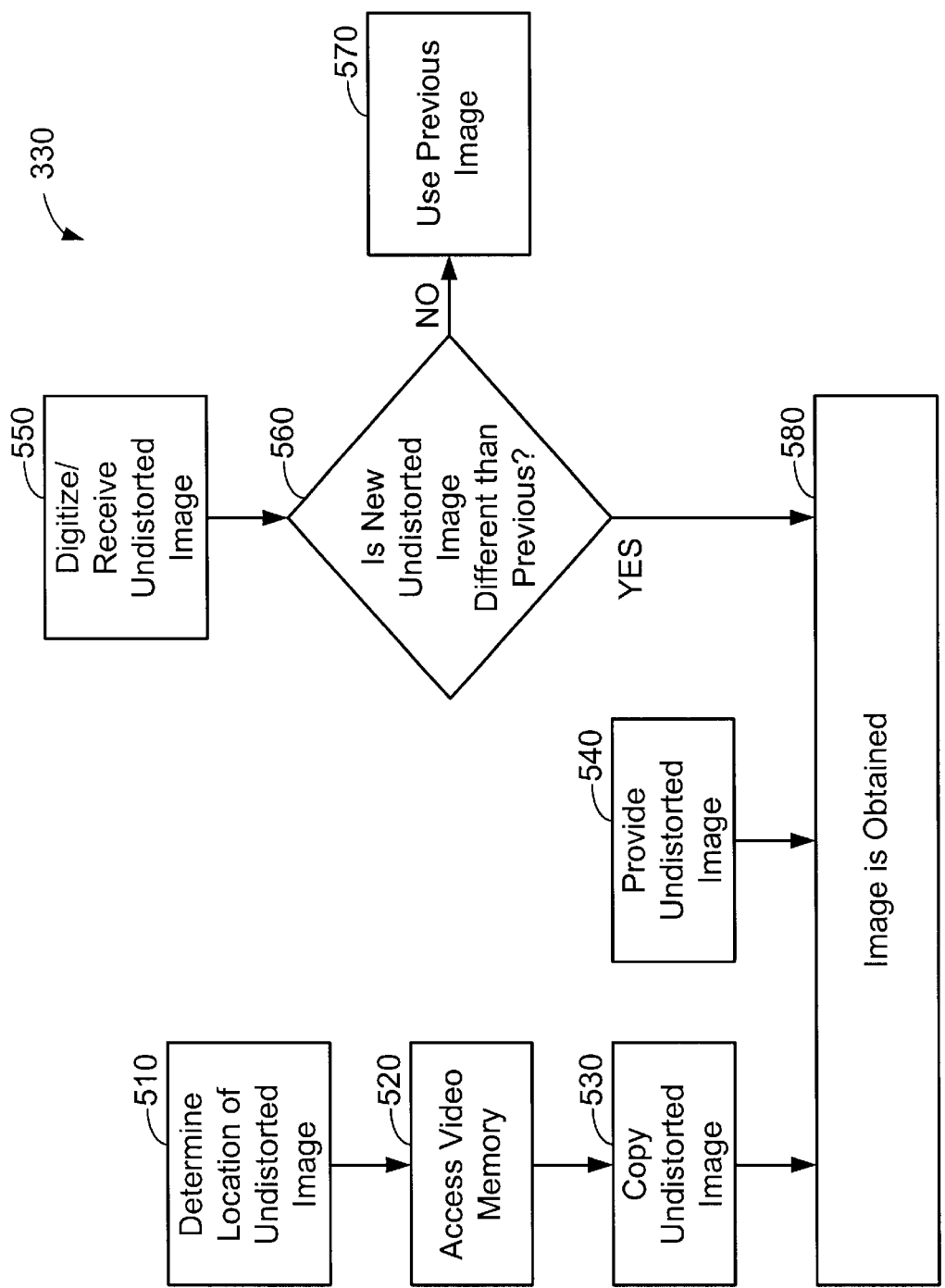
FIG. 5 is a flowchart of a method for obtaining an image to display in accordance with one embodiment of the present invention.

Referring now to FIG. 5, this figure shows a method 330 for obtaining an undistorted image for display. Method 330 is performed whenever it is desired that a new image be retrieved or to check to determine if a new image has arrived. Method 330 allows multiple different branches for receiving undistorted images. For instance, the branch having steps 510 through 530 is for retrieving images from a video display, the branch having step 540 is for using a bitmap or presentation software image, and the branch having steps 550 through 570 is for receiving a series of images, such as film images.

In step 510, the location in video memory of the undistorted image is determined. This will generally be determined through access to a graphics API, which will provide the functionality to determine where an image is. In step 520, the video memory is accessed, which will also generally be performed through a graphics API. In step 530, a copy of the undistorted image is made, and is generally stored in a different location. For a computer system, the video memory will generally be on a video adapter and the undistorted image will be copied from the video memory to main memory, which could be Random Access Memory (RAM) or long-term storage memory such as a hard drive.

If the video memory is not used, another program or the operator could provide the undistorted image to the multiple-surface display projector. This occurs in step 540. For instance, the operator could select an image from a drop-down box (as shown in FIG. 6). Additionally, an program, such as a presentation editor, could provide a slide to the multiple-surface display projector. Additionally, the image can be provided through its network address using the URL (Uniform Resource Locator) standard.

Alternatively, a video stream of images, such as from a DVD player or from the video output of a computer, could be displayed. In step 550, the multiple-surface display projector receives an undistorted image. This could be performed by taking the digital video output of a DVD player and storing the digital information. This step may also include decompressing information, such as if a Motion Picture Experts Group (MPEG) stream is the input to a multiple-surface display projector. This step may also include digitizing an undistorted image. This could occur when an analog video output from a DVD player is used as an input to a multiple-surface display projector. Moreover, the multiple-surface display projector could, if desired, additionally process the undistorted image, such as performing 3:2 pulldown for film sources. In step 560, it is determined if the new undistorted image is different than the previous undistorted image.

If not (step 560=NO), the previous image is used (step 570). Additionally, method 300 should be notified of this fact so that steps 340 (mapping the undistorted image to the correction surface), 350 (outputting the distorted image) and 360 (project distorted image) can be skipped. This process will reduce the number of times undistorted images are loaded to a distortion controller for subsequent distortion. It should be noted that skipping steps 340 through 360 will still allow the previously displayed image to be displayed. If the distortion controller is fast enough, then it is not necessary to skip steps 340 and 350 of FIG. 3.

If the new image is different from the previous image (step 560=YES), then, in step 580, the undistorted image is obtained for display. Step 580 may also be reached through steps 530 and 540. Thus, at the end of method 330, an undistorted image is received and ready to be distorted and projected.

Turning now to FIG. 6, this figure shows a screen shot of a GUI useful for determining and saving parameters for a destination area. FIG. 6 shows a screen 600 having three windows 610, 620, and 630. Window 610 allows access to the parameters of the different devices shown in FIG. 1, such as the projector controller and the pan/tilt head, and also allows the selection among pre-defined surface and viewports to be selected. The surface is the destination surface and destination area, selectable, e.g., from a dropdown box. Currently, the "default" destination area is selected. The viewport is the source of the undistorted image to be displayed, and this can also be selected through a dropdown box. The current viewport is "logo."

The load button of window 610 will load previously saved parameters for a set of surfaces. The save button of window 610 will save the parameters for a set of surfaces. The viewport image loads when the viewport is selected in the dropdown box (currently labeled "logo") and the "viewport" button is pressed.

Window 620 allows parameters for the projector, mirror and correction surface to be adjusted for the particular case where the projected surface is planar. The mirror parameters are pan and tilt locations, which are adjustable through, e.g., sliders or by directly entering numbers. The numbers beneath the pan and tilt locations indicate the current settings of these locations. The projector portion allows the zoom and focus of the projector to be changed. The render area portion allows the correction surface parameters to be changed. As previously discussed, these parameters are the X, Y and Z (written as RX, RY, and RZ parameters, respectively, in FIG. 6) that define the rotations of a correction plane about the X, Y, and Z axes, respectively, a scale that defines how the image is to be scaled, a lens that defines the focal length of a virtual camera, and X and Y translations (written as TX and TY parameters, respectively, in FIG. 6) that define X and Y translations, respectively, of the correction plane on the X-Y plane.

Window 630 contains correction surface 640 which has a calibration image 650 displayed on it as a texture. This image is called "logo" in window 610. Changing any of the render area parameters in window 620 will cause a change in the correction surface 640 and, consequently, a distortion in calibration image 650. However, changing mirror or projector parameters will not change the correction surface 640 but will change the location of the displayed image.

What has been shown so far is a multiple-surface display projector that can project a distortion-free image onto a surface. However, this multiple-surface display projector did not allow interaction between human operators and the multiple-surface display projector. The discussion that follows concerns interactive versions of the multiple-surface display projector.

Figure 7:
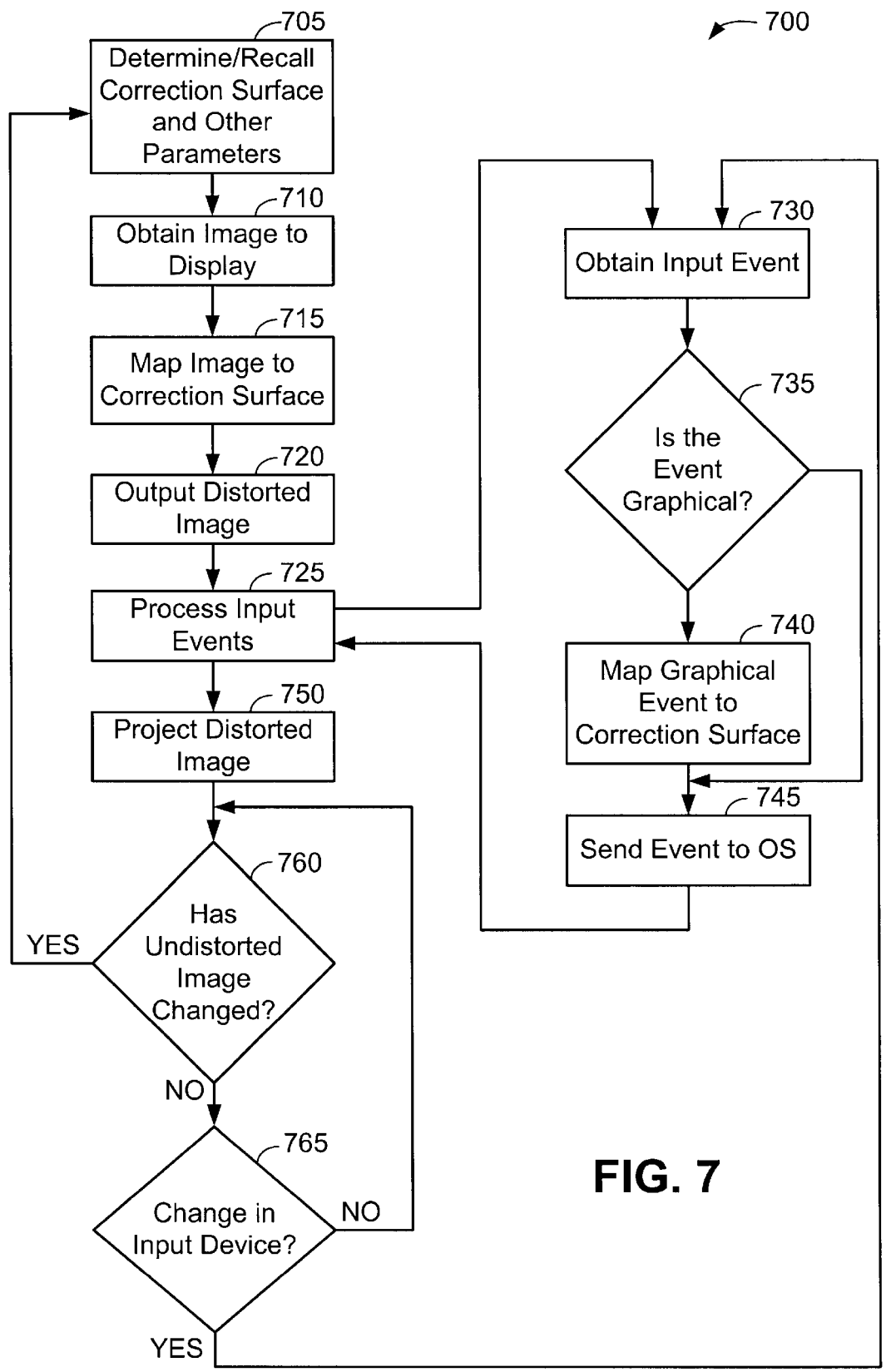
FIG. 7 is a flowchart of a method, in accordance with one embodiment of the present invention, for incorporating interactive input into a projected image.

Referring now to FIG. 7, this figure shows a flowchart of a method 700 that integrates interactive input into a multiple-surface display projector. The multiple-surface display projector may be used with any type of interactive input, such as mice, keyboards or voice commands. Many of the steps in method 700 have been previously discussed in reference to FIG. 3 and other figures. Consequently, only new steps will be discussed in detail.

Method 700 begins when the correction surface and other parameters are determined or recalled (step 705). In step 710, the undistorted image to be displayed is obtained, which may be performed by method 330 of FIG. 5. The undistorted image is mapped to a correction surface (step 715) and output to a video projector (step 720).

In step 725, input events are processed. Processing begins by obtaining an input event (step 730). Such input event could be the movement of a wireless mouse or the striking of a key on a wireless keyboard. Wireless devices are preferred as they are more mobile. The input event could also be someone speaking a term that corresponds to a term being displayed. In step 735, it is determined if the event is graphical. For instance, if a mouse is moved, the cursor for the mouse must also be moved. If a key is pressed, the key may be displayed on the displayed image. If the event is a timeout event of a timer, it is not classified as graphical and the system goes straight to step 745.

In step 740, the graphical event is mapped to the correction surface. The current position of a cursor/mouse pointer is determined and an appropriate image is mapped to the correction surface and placed over any data that already exists there. Generally, this may be done by loading an undistorted image of the event at a particular location in the memory of a video adapter and allowing the video adapter to distort the undistorted image (having the overlayed event image). For instance, if a mouse is moved, the image of the mouse pointer can be retrieved, the location of the new mouse location in the undistorted image retrieved, and the image of the mouse pointer loaded into video memory at the appropriate location. The video adapter with then can distort the entire image. Alternatively, the event image can be distorted during the mapping to the correction surface and then be overlayed over the image current on the correction surface.

In step 745, the event is sent to the operating system (OS), if desired. Generally, for such events as mouse movements or keyboards, the operating system can be used to keep track of the data being displayed. This is particularly true if the displayed image is from the video memory of a computer system. Additionally, this step could also entail sending voice information to the OS to be turned to text.

The distorted image is projected in step 750, and a determination as to whether the undistorted image has changed is made in step 760. In step 765, it is determined if there has been a change in the input device. The multiple-surface display projector could be notified of such changes through interrupts or the multiple-surface display projector could poll for changes. If there are no changes (step 765=NO), the same image is output; if there are changes (step 765=YES), the input event is again obtained in step 730 and the method from step 730 is performed.

Figure 8:
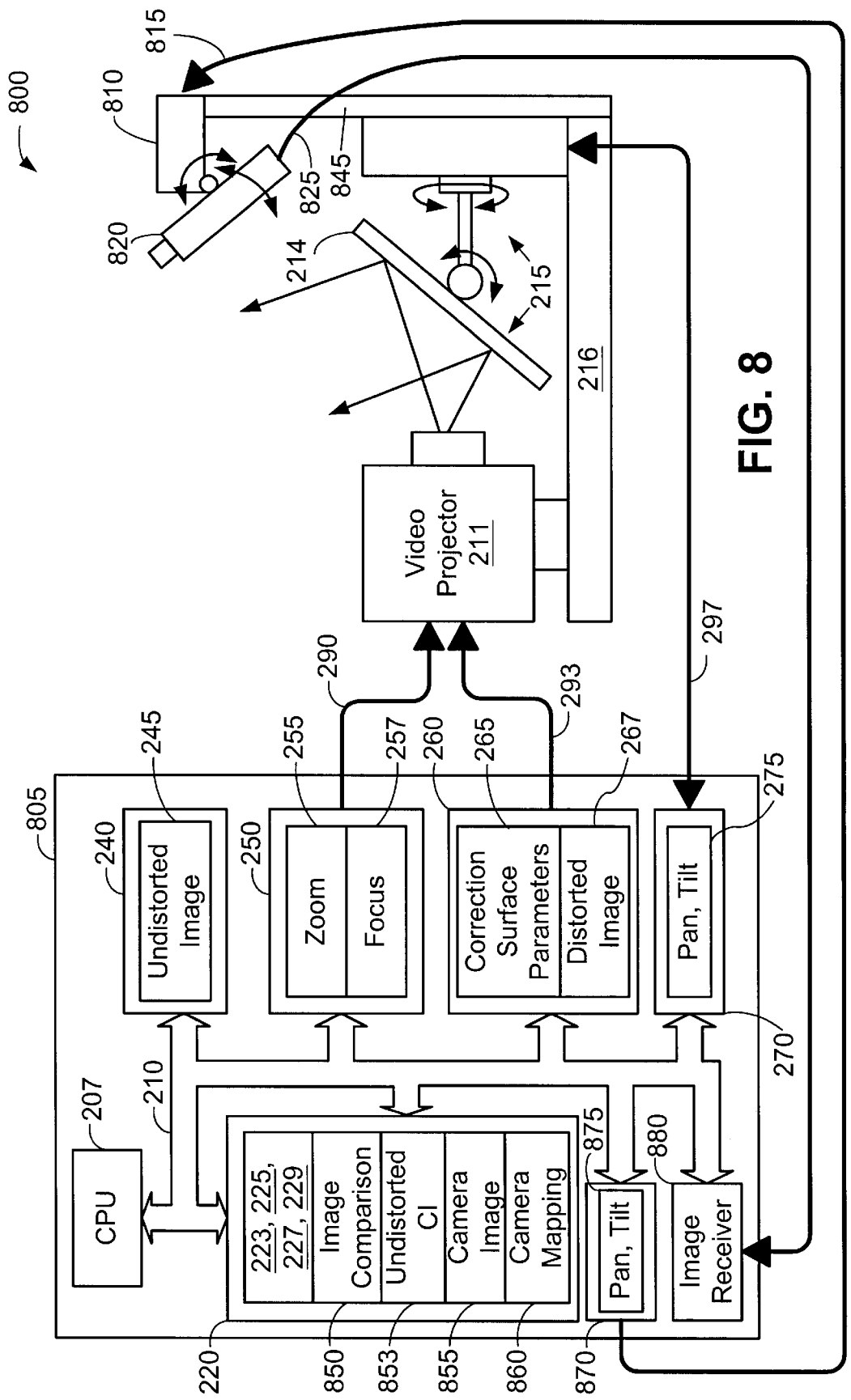
FIG. 8 is a block diagram of a multiple-surface display projector in accordance with one embodiment of the present invention.

Referring now to FIG. 8, this figure shows a multiple-surface display projector 800 that allows for interaction with the projected image and for automatic calibration. Many of the elements of multiple-surface display projector 800 have been discussed in reference to FIG. 2. Therefore, only additional elements will be discussed. It should be noted that multiple-surface display projector 800 can contain elements of FIG. 2, such as the video receiver 230, video source 280, network connections and disk 251, but these have been removed from FIG. 8 for space considerations.

Multiple-surface display projector 800 further comprises a camera 820 having multiple degrees of freedom, a camera pan/tilt device 810 connected to the camera 820, a camera connection 845 that connects the redirection device 215 to the camera pan/tilt device 810, and a multiple-surface display controller 805. Camera pan/tilt device 810 allows the camera to be positioned at one of a multitude of different positions that are allowed by the multiple degrees of freedom of the camera.

Multiple-surface display controller 805 has memory 220 that comprises additional elements of an image comparison 850, an undistorted Camera Image (CI) 853, a camera image 855, and a camera mapping 860. Multiple-surface display controller 805 also has a camera controller 870 and an image receiver 880. Camera controller 870 has pan and tilt locations 875.

Camera controller 870 adjusts the pan and tilt location of camera 810 by adjusting the pan and tilt locations 875 and by transmitting these to camera pan/tilt device 810. This allows the camera point to the displayed image, which allows feedback and interactive capabilities.

Image receiver 880 receives images from camera 820 and can optionally process those images or package them for use by the multiple-surface display projector method 223. A camera image is defined herein as the image received by a camera, such as camera 820. The camera image should be a reflected version of the displayed image that reflects off the destination area to the camera (and, in FIG. 9 below, off the mirror to the camera).

Camera mapping 860 may be placed in image receiver 880, if for instance image receiver 880 is a video adapter, or could be placed in memory 860. Camera mapping 860 is the information needed to transform each pixel in the camera image 855 to an equivalent position in an undistorted image. In this manner, the original undistorted image (such as undistorted image 245) and the undistorted camera image 853, after being mapped from the camera image 855, can be compared. The undistorted camera image is defined herein as the camera image after it has been changed back to an undistorted form. The undistorted camera image 853 should be comparable to an undistorted image, such as undistorted image 245, and calibration is performed to ensure that this is so.

Image comparison 850 is data that results from comparing an undistorted image with the undistorted camera image 853. This data is used to provide automatic calibration or to provide interactive capability.

Figure 9:
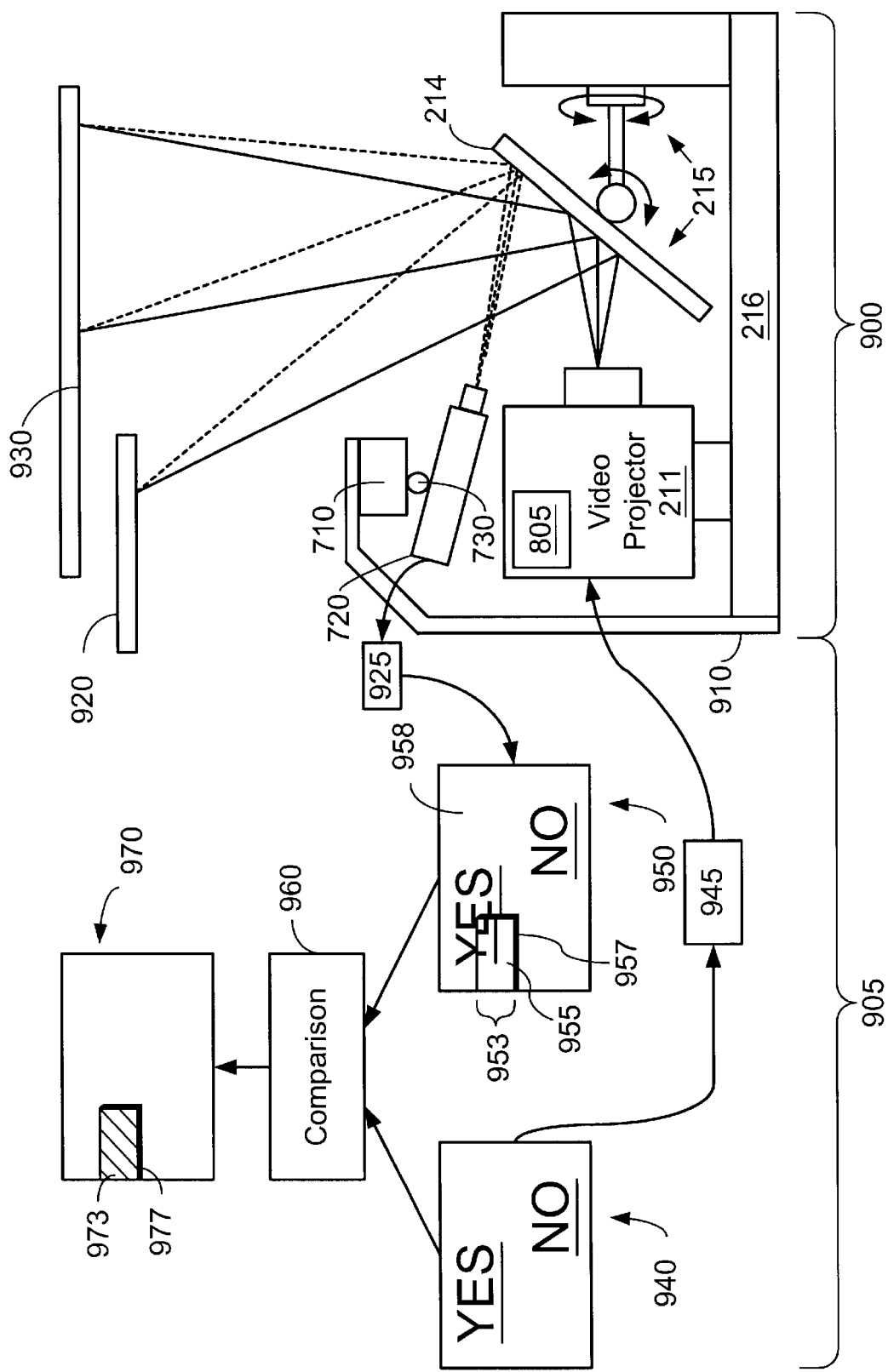
FIG. 9 is a block diagram of a multiple-surface display projector in accordance with one embodiment of the present invention.

Referring now to FIG. 9, this figures shows multiple-surface display projector 900 and a graphical representation 905 of a comparison between sent and received images. In the multiple-surface display projector 900 of FIG. 9, the multiple-surface display projector 805 is alternatively built into video projector 211. Camera 720 is in an alternative location that can collect images reflected off of mirror 214, and camera pan/tilt device 710 is held by extension 910. Video projector 211 is projecting an image onto destination area 930 and there is a foreground obstruction 920 that also reflects some of the projected image.

Graphical representation 905 helps to graphically illustrate the comparison of sent and received images. The undistorted image 940 is distorted in block 945 and output to the video projector, which projects a projected image. This image hits the destination surface at destination area 930 and also hits the foreground obstruction 920. These images are reflected back to mirror 214, which reflects them into camera 720. The camera image received by the camera is mapped, in block 925, to an undistorted camera image 950.

Undistorted image 940 has two interactive items: "YES" and "NO" hyperlinks. Undistorted camera image 950 also has the same two interactive items, only the "YES" has been partially distorted by foreground obstruction 920. This creates a distorted region 953 that comprises a distorted area 955 and a border 957. One way to determine if there is an obstruction is to compare colors between distorted area 955 and the equivalent area on undistorted image 940. If the colors are different, it is likely that there is an obstruction at this location. Another way to determine if there is an obstruction is to look for the border 957, which is generally a dark area where there is no dark area in the undistorted image 940. Yet another way to determine if there is an obstruction is to determine if portions of items in the undistorted image are now in different locations. For example, the bottom of the Y and the E are not in the correct positions.

Block 960 compares the two images and develops an image comparison 970. This image comparison 970 has a changed area 973 and a border 977. The multiple-surface display projector 900 can determine from this data that there is an obstruction at this location and that this obstruction covers the "YES" interactive item. The "YES" interactive item can then be activated.

Multiple-surface display projector 900 can also determine whether objects other than obstructions are near interactive items. For example, a laser pointer could be near an interactive item. To determine the position of the laser pointer, the undistorted image could be compared to the undistorted camera image. Color changes, above a certain threshold, could then determine the position of the laser pointer. Block 906 could take this situation into account. Block 960 can also take a specific object into account. Such a specific object could be, for instance, a piece of cardboard with a printed icon on it. Block 960 could determine the location of the specific object by comparing an undistorted image of the specific object, the undistorted image and the undistorted camera image, looking for an outline of the specific object, or through other methods known to those skilled in the art. Some of these methods are discussed in Crowley et al., "Things that see," Communications of the Association for Computing Machinery (ACM), Vol. 43(3), pp. 54–64, 2000, the disclosure of which is incorporated herein by reference.

Thus, the systems of FIGS. 8 and 9 allow a person to interact with a projected image.

Figure 10:
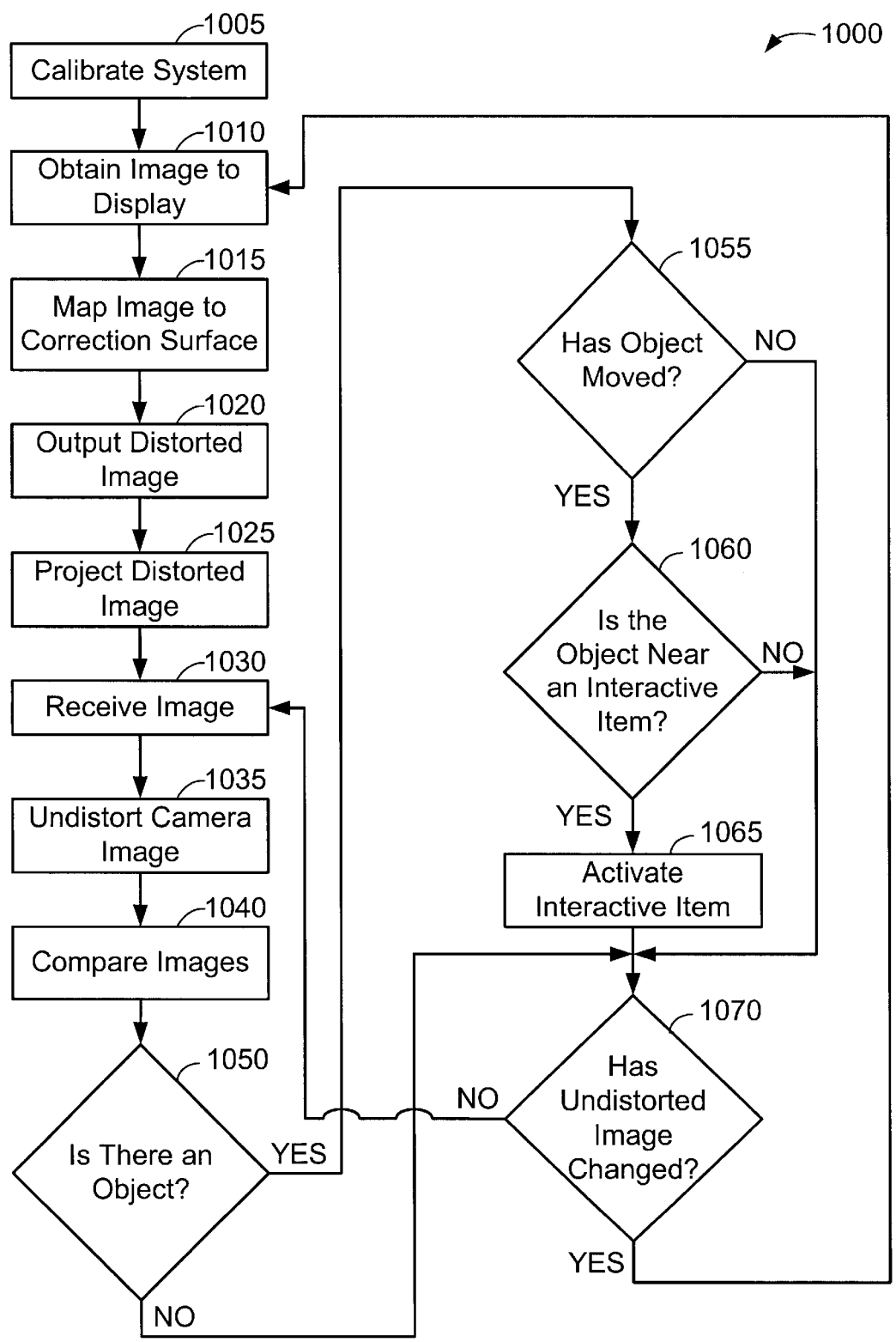
FIG. 10 is a flowchart of a method, in accordance with one embodiment of the present invention, for determining if an object is near an interactive item and, if so, for activating the interactive item.

Turning now to FIG. 10, this figure shows a flowchart of a method 1000 for determining if an obstruction is near an interactive item and, if so, for activating the interactive item. Many of the steps in method 1000 have already be discussed, and more time will be spent discussing new steps. Method 1000 is used whenever it is desired that there be interaction between a person and a displayed image.

Method 1000 starts when the system is calibrated for both projection and camera reception (step 1005). This will be explained in greater detail in FIG. 11. In step 1010, the undistorted image to display is obtained. This has previously been discussed with reference to FIG. 5. The undistorted image is mapped to a correction surface (step 1015), and the distorted image is output (step 1020) and projected (step 1025). In step 1030, the reflected images are received. The camera image that is received is then undistorted (step 1035) by using parameters stored in the calibration step (step 1005). The undistorted image and the undistorted camera image are compared in step 1040.

Some comparisons have already been discussed. As is known in the art, these are a variety of comparisons that can be used. The following is a list of references, the disclosure of which is hereby incorporate by reference, that describes comparison steps or methods that can be used with the present invention: Wren et al., "Pfinder: Real-Time Tracking of the Human Body," Institute for Electronic and Electrical Engineers (IEEE) Trans. Pattern Analysis and Machine Intelligence, 1997, 19(7), p. 780–785; Bobick et al., "The KidsRoom: A Perceptually-Based Interactive Immersive Story Environment," PRESENCE: Teleoperators and Virtual Environments, 1999, 8(4), p. 367–391; Davis et al., "Virtual PAT: a Virtual Personal Aerobics Trainer," Proc. of Workshop on Perceptual User Interfaces (PUI'98), 1998, San Francisco, Calif.; and Ivanov et al., "Fast Lighting Independent Background Subtraction," Proc. of the IEEE Workshop on Visual Surveillance (VS'98), 1998, Bombay, India.

In step 1050, it is determined whether there is an object. The object could be a foreground obstruction, which is an object between the redirection device and the destination area, a laser pointer shined onto the destination area, or a specific device, either a device placed on the destination area or a foreground obstruction. If there is no object (step 1050=NO), the method proceeds in step 1070. If there is an object (step 1050=YES), it is determined if the object has moved from the previous time that method 1000 was performed. This step allows the object to be tracked and also can prevent multiple interactions with an interactive event. For instance, if the object is near an interactive item, and the interactive item was previously activated, the displayed image could change. It could be that the object is near or directly over a new interactive item. This could cause the new interactive item to be selected even though the operator may not want to select this item. There are other ways of preventing this from happening, such as delaying input from obstructions for a short period of time after changing images.

In step 1055, if the object has not moved (step 1055=NO) from the previous iteration of method 1000, the method again starts in step 1070. If the object has moved (step 1055=YES), it is determined if the object is within some predetermined distance from an interactive item. If the object is not near an interactive item (step 1060=NO), the method proceeds at step 1070. If the object is near an interactive item (step 1060=YES), then the interactive item is activated (step 1065). This could entail adding a new undistorted image having new interactive items or performing other functions. Alternatively, the movement of the object can be associate to a graphical element that can be moved over the surface. For instance, the movement of the object can be associated directly with the OS mouse events of a computer system, and allow "drag" operations by hand.

In step 1070, it is determined whether the undistorted image has changed. If the undistorted image has not changed (step 1070=NO), the method continues to track or look for obstructions by proceeding at step 1030. If the undistorted image has changed (step 1070=YES), such as if activation of the interactive item has changed the undistorted image, another undistorted image to display is retrieved in step 1010.

Thus, method 1000 allows a person to interact with a projected image. There are many uses for this type of system. As an example of such a use, a mechanic could interact with a projected image to bring up detailed diagrams of the part of a vehicle on which he or she is working.

Figure 11:
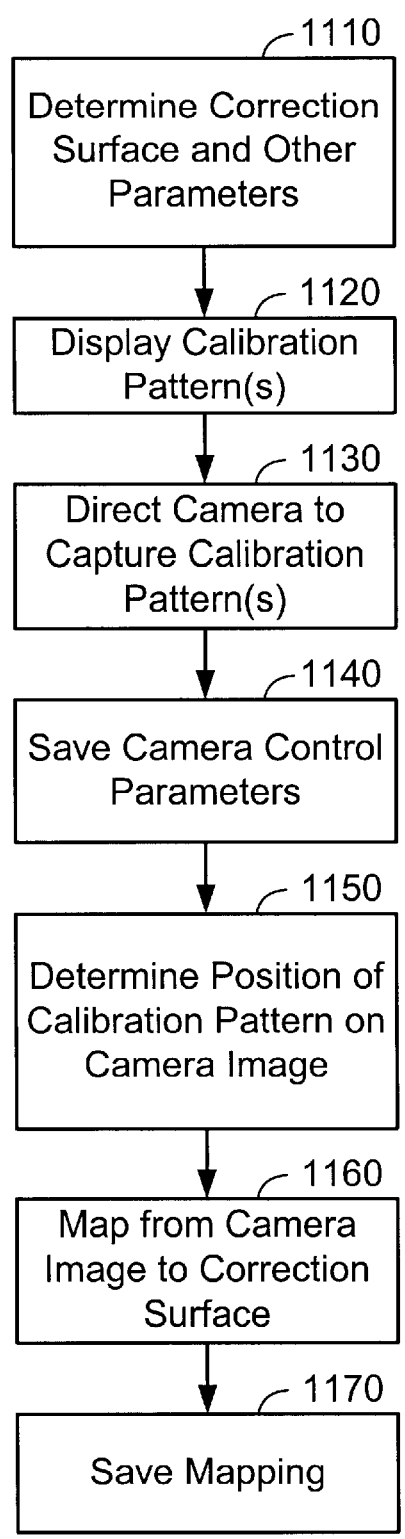
FIG. 11 is a flowchart of calibration, in accordance with one embodiment of the present invention, of a multiple-surface display projector system having a camera.

Turning now to FIG. 11, a method 1005 is shown that allows a multiple-surface display projector to be calibrated for both projection and reception. Method 1005 is used whenever a new destination area is going to be used, for periodic calibration, or if a previously calibrated destination area has changed.

Method 1005 begins when the correction surface and other parameters are determined for a selected destination area (step 1110). This has been discussed in reference to FIG. 4, although with camera feedback the method of FIG. 4 can be automated. In step 1120, a calibration pattern is displayed on the destination surface. In step 1130, the camera is positioned, through adjusting tilt and pan location parameters, to capture the calibration pattern.

The camera control parameters, which are the pan and tilt locations, are stored for the current destination area (step 1140). The position of the calibration pattern on the camera image is determined (step 1150), and the camera image is mapped to the correction surface in step 1160. This will allow the camera image, mapped to the correction surface, to then be undistorted. This mapping will map the received image to an original plane and area, essentially matching each received pixel with each original pixel of the undistorted image. This mapping can be easily determined by manual or automatic detection of only four points on the projected surface. This is a well known process. In step 1170, the mapping parameters are saved.

Also, it is beneficial to run steps 1120, 1150, 1160 and 1170 with color calibration patterns. The color calibration patterns are projected (step 1120) to determine the color parameters of the surface. The camera image of the color calibration patterns are compared to the original color of the original color calibration pattern for each pixel (step 1160), and color correction information is stored (step 1170). Typically, the color calibration patterns are simply white, red, green, and blue rectangles.

Thus, what has been shown is a multiple-surface display projector with interactive capability. The multiple-surface display projector can illuminate any surface with an distortion-free image and can allow operators to interact directly with the displayed image.

It is to be understood that the embodiments and variations shown and described herein are merely illustrative of the principles of this invention and that various modifications may be implemented by those skilled in the art without departing from the scope and spirit of the invention. For instance, the camera may be placed in different positions and many of the method steps may be performed in different orders. Moreover, if the multiple-surface display projector is used to project only onto one destination area of one destination surface, the mirror could be fixed into a permanent position.

What is claimed is:

1. A multiple-surface display projector comprising:
   a multiple-surface display controller adapted to distort an undistorted image into a distorted image;
   a video projector coupled to the multiple-surface display controller and adapted to project the distorted image; and
   a redirection device positioned to redirect the projected and distorted image onto a destination area of a destination surface.

2. The multiple-surface display projector of claim 1, wherein the redirection device comprises a mirror, wherein the mirror is adapted to move about multiple degrees of freedom, the mirror positioned to receive the projected image from the video projector and to reflect the projected image onto the destination area.

3. The multiple-surface display projector of claim 2, wherein the redirection device comprises a pan/tilt head that itself comprises the mirror and a pan/tilt mechanism, the pan/tilt mechanism adapted to move the mirror to a specific location about the multiple degrees of freedom, the specific location selected whereby the mirror reflects the distorted image onto the destination area.

4. The multiple-surface display projector of claim 3, wherein the pan/tilt mechanism is adapted to move the mirror relative to multiple axes.

5. The multiple-surface display projector of claim 4, wherein the pan/tilt mechanism is adapted to move the mirror to a specific pan location and a specific tilt location.

6. The multiple-surface display projector of claim 1, wherein:
the multiple-surface display controller comprises a means for distorting the undistorted image into the distorted image;
the video projector comprises a means for projecting the distorted image; and
the redirection device comprises a means for redirecting the projected and distorted image onto a destination surface.

7. The multiple-surface display projector of claim 1, further comprising a camera positioned to receive a camera image that comprises an image reflected from the destination area.

8. The multiple-surface display projector of claim 7, wherein the multiple-surface display controller undistorts the camera image to create an undistorted camera image and wherein the multiple-surface display controller compares the undistorted image with the undistorted camera image to determine if there is an object on the camera image.

9. The multiple-surface display projector of claim 8, wherein the multiple-surface display controller determines if the object is near an interactive item and, if so, activates the interactive item.

10. The multiple-surface display projector of claim 9, wherein the object is an obstruction, an area of light from a laser pointer or a specific object.

11. The multiple-surface display projector of claim 1, wherein the multiple-surface display controller further comprises zoom and focus information, and wherein the multiple-surface display controller communicates the zoom and focus information to the video projector.

12. The multiple-surface display projector of claim 1, further comprising a distortion controller adapted to distort the undistorted image into the distorted image.

13. The multiple-surface display projector of claim 12, wherein the distortion controller comprises a video adapter and where the multiple-surface display controller sets parameters of a correction surface in the video adapter and places the undistorted image as a texture on the correction surface.

14. The multiple-surface display projector of claim 13, wherein the parameters of the correction surface are RX, RY, RZ, lens, scale, TX, and TY.

15. A method to project a substantially distortionless image on any of a multiple of surfaces and for providing interaction with the substantially distortionless image, the method comprising:
distorting an undistorted image to create a distorted image, the step of distorting performed so that a projected image of the distorted image will be substantially undistorted when projected onto a destination area on a destination surface;
projecting the distorted image; and
redirecting projected light to a predetermined position selected to illuminate the destination area with the projected and distorted image.

16. The method of claim 15, wherein the predetermined position comprises a pan location and a tilt location of a mirror.

17. The method of claim 15, wherein the projected and distorted image at the destination area is a displayed image, and where the method further comprises the steps of:
receiving a camera image that comprises a reflected version of the displayed image;
determining if there is an object; and
if there is an object, performing the steps of:
determining a location of the object; and
determining if the object is within a predetermined distance from an interactive item.

18. The method of claim 17, wherein the step of determining if there is an object comprises the step of undistorting the camera image by mapping the camera image to an original plane and surface area.

19. The method of claim 18, wherein the step of determining if there is an object comprises the step of comparing the undistorted image and the image that results from undistorting the camera image.

20. The method of claim 15, wherein the step of distorting comprises the step of mapping the undistorted image to a correction surface.

21. The method of claim 15, wherein the step of projecting further comprises the step of adjusting zoom and focus.

22. A system to project a substantially distortionless image on any of a multiple of surfaces and for providing interaction with the substantially distortionless image, the system comprising:
a computer system comprising:
a memory that stores computer-readable code; and
a processor operatively coupled to the memory, the processor configured to implement the computer-readable code, the computer-readable code configured to:
distort an undistorted image to create a distorted image, the distortion performed so that a projected image of the distorted image will be substantially undistorted when projected onto a destination area on a destination surface;
output the distorted image to a projector suitable for projecting video; and
cause a redirection device to redirect projected light to a predetermined position selected to illuminate the destination area with the projected and distorted image.

23. The system of claim 22, further comprising:
the redirection device that comprises a mirror and that is coupled to computer, wherein the mirror is adapted to move about multiple degrees of freedom, the mirror positioned to receive the projected image from the video projector and to reflect the projected image onto the destination area; and
a video projector placed to project images onto the mirror and coupled to the computer.

24. The system of claim 23, wherein the computer-readable code is further configured to communicate a pan location and a tilt location to the redirection device.

25. The system of claim 22, further comprising a camera positioned to receive a camera image that comprises an image reflected from the destination area, wherein the camera is coupled to the computer system.

26. The system of claim 25, wherein the computer-readable code is further configured to undistort the camera image to create an undistorted camera image and to compare the undistorted image with the undistorted camera image to determine if there is an object on the camera image.

27. The system of claim 26, wherein the computer-readable code is further configured to determine if the object is near an interactive item and, if so, to activate the interactive item.

28. The system of claim 27, wherein the object is an obstruction, an area of light from a laser pointer or a specific object.

29. An article of manufacture comprising:

a computer readable medium having computer readable code means embodied thereon, the computer readable program code means comprising:

a step to distort an undistorted image to create a distorted image, the distortion performed so that a projected image of the distorted image will be substantially undistorted when projected onto a destination area on a destination surface;

a step to output the distorted image to a projector suitable for projecting video; and a step to cause a redirection device to redirect projected light to a predetermined position selected to illuminate the destination area with the projected and distorted image.

30. The article of manufacture of claim 29, wherein the computer-readable code means further comprises a step to communicate a pan location and a tilt location to the redirection device.

31. The article of manufacture of claim 29, wherein the computer-readable code means further comprises a step to undistort the camera image to create an undistorted camera image and a step to compare the undistorted image with the undistorted camera image to determine if there is an object on the camera image.

32. The article of manufacture of claim 31, wherein the computer-readable code means further comprises a step to determine if the object is near an interactive item and, if so, to activate the interactive item.

33. The article of manufacture of claim 32, wherein the object is an obstruction, an area of light from a laser pointer or a specific object.

* * * * *

UNITED STATES PATENT AND TRADEMARK OFFICE
CERTIFICATE OF CORRECTION

PATENT NO. : 6,431,711 B1 Page 1 of 1
DATED : August 13, 2002
INVENTOR(S) : Claudio S. Pinhanez It is certified that error appears in the above-identified patent and that said Letters Patent is hereby corrected as shown below:

<u>Title page,</u>
Item [56], OTHER PUBLICATIONS, the following references should be listed:

-- Bobick et al., "The KidsRoom: A Perceptually-Based Interactive Immersive Story Environment," PRESENCE; Teleoperators and Virtual Environments, 367-391 (1999).
Crowley et al., "Things That See," Communications of the ACM, V. 43, 54-64 (2000).
Davis et al., "Virtual PAT: a Virtual Personal Aerobics Trainer," Proc. of Workshop on Perceptual User Interfaces (1998).
Inami et al., "Head-Mounted Projector for Projection of Virtual Environments on Ubiquitous Object-Oriented Retroreflective Screens in Real Environment," SIGGRAPH'99, 245 (1999).
Ivanov et al., "Fast Lighting Independent Background Substraction," Proc. of the IEEE Workshop on Visual Surveillance (1998).
Raskar, "Oblique Projector Rendering on Planar Surfaces for a Tracked User," SIGGRAPH99, 179-188 (1998).
Raskar et al., "The Office of the Future: A Proc. of SIGGRAPH'98," p. 179-188, (1998).
Rekimoto, "A Multiple Device Approach for Supporting Whiteboard-based Interactions," Proc. of CHI'98 (1998).
Underkoffler et al. "Emanicipated Pixels: Real-World Graphics in the Luminous Room," Proc. of SIGGRAPH'99, 385-392 (1999).
Wren et al., "Pfinder: Real-Time Tracking of the Human Body," Pattern Analysis and Machine Intelligence, 780-785, (1997). --

Signed and Sealed this

Eleventh Day of February, 2003

JAMES E. ROGAN
*Director of the United States Patent and Trademark Office*